United States Patent Office 3,170,897
Patented Feb. 23, 1965

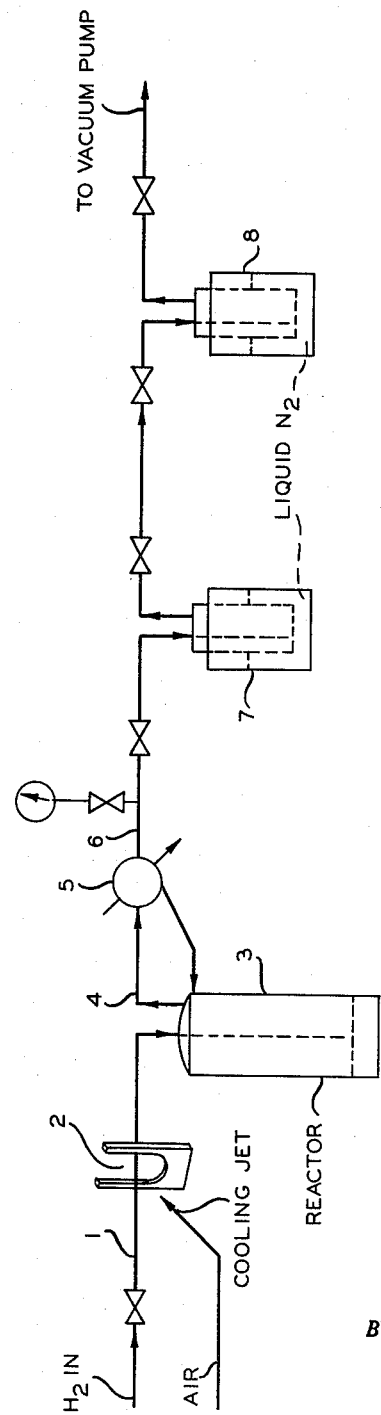

3,170,897
REACTION OF ATOMIC HYDROGEN WITH AN ALIPHATIC ALCOHOL AND REACTION PRODUCTS THUS PRODUCED
Paul W. Solomon, Bartlesville, Okla., assignor to Phillips Petroleum Company, a corporation of Delaware
Filed Dec. 2, 1960, Ser. No. 73,289
19 Claims. (Cl. 260—67)

This invention relates to the reaction of an alcohol and atomic hydrogen. In one of its aspects, the invention relates to the reaction of an alcohol in liquid phase with atomic hydrogen to obtain interesting reaction products. In another of its aspects, the invention relates to the production of certain compounds such as aldehydes, ketones, hydrocarbons, oils, polymer substances, e.g., polyoxymethylene polymer, other alcohols, etc., by a reaction of an alcohol in liquid phase with atomic hydrogen at a low temperature, for example, ambient temperature of the order of 60° C. and below. Further, the invention relates to certain and novel compounds, e.g., meso-5,6-decanediol. Generally, the invention is concerned primarily to convert low molecular weight alcohols by reactions, which for convenience, can be considered illustrated as follows.

*Primary Alcohols*

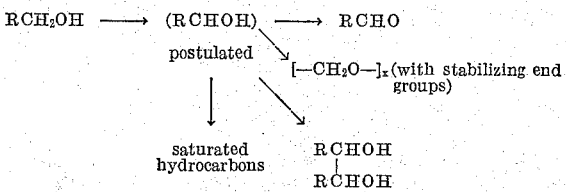

*Secondary Alcohols*

$$R_2CHOH \rightarrow R_2C=O$$

*Tertiary Alcohols*

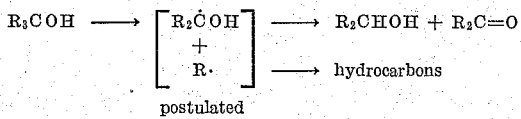

When an alcohol of, say, eight carbon atoms or higher is used as a starting alcohol, the above illustrated reactions are not always followed by the reacting mass. For example, n-octanol yields a resin which is cross-linked and which has hydroxyl and carbonyl groups and some octanol. Principally, the reaction mass will contain, ordinarily, a compound selected from an aldehyde and a ketone. Thus, in accordance with the process of the present invention, I make aldehydes and ketones from liquid alcohols by reaction with atomic hydrogen:

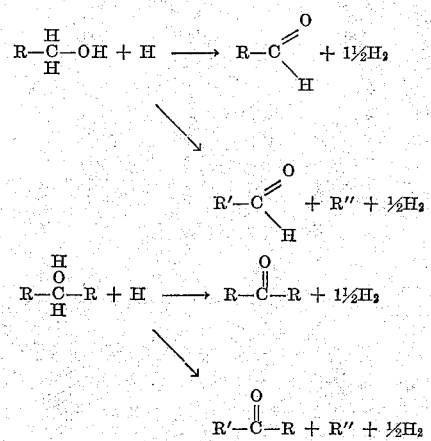

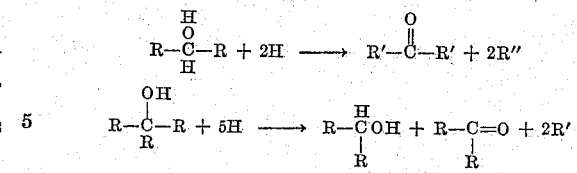

Starting materials for use in the process of the invention include all aliphatic primary, secondary, and tertiary alcohols having from 1–18 carbon atoms in the case of primary alcohols, from 3–18 carbon atoms in the case of secondary alcohols and from 4–18 carbon atoms in the case of tertiary alcohols.

It is known to catalytically treat an alcohol in the presence of molecular hydrogen to convert a portion of the same to an aldehyde. Thus, conversion of a mixture of ethyl alcohol and n-propyl alcohol with hydrogen in the presence of a magnesia, copper oxide, alumina, iron oxide, phosphorus acid containing catalyst at 321° C. (608° F.) to obtain acetaldehyde, propionaldehyde, butyl alcohol, amyl alcohol, and higher alcohols has been reported. Conversion of propyl, butyl, and amyl alcohols to obtain heptyl and octyl alcohols under similar conditions has also been reported. A process for preparing aldehydes from acetylenic alcohols with a hydrogenation catalyst under acid conditions at temperatures of the order of 50–200° C. (122–392° F.) has also been reported. The reactions which were effected were conducted at 95° C. and 200° C., respectively. Further, the catalytic dehydrogenation of alcohols to aldehydes and ketones has also been reported at reaction temperatures of about 190° C. to 260° C., the alcohols used being aliphatic alcohols boiling in the temperature range of approximately 150° C. to 250° C.

I have now found that at temperatures which are substantially ambient or below I can convert an alcohol with atomic hydrogen to produce interesting reaction products including at least one of an aldehyde, a ketone, polyoxymethylene, a cross-linked resin, another alcohol, oils, polymer substances, etc.

It is an object of this invention to react an alcohol at a temperature which is ambient or below to obtain at least one of an aldehyde, a ketone, a polyoxymethylene, a cross-linked resin, another alcohol, an oil, a hydrocarbon, a polymer substance, etc. It is another object of the invention to provide a novel compound. It is a further object of the invention to provide a novel cross-linked resin. It is a further object of this invention to provide a modus operandi for bringing about a reaction between an alcohol and atomic hydrogen.

Other aspects, objects and the several advantages of this invention are apparent from a study of the disclosure and the appended claims.

Thus, according to the present invention, there is provided a process for the preparation of a reaction product by the step of bringing together a liquid alcohol or an alcohol in liquid phase with atomic hydrogen at a temperature suitable to maintain the reacting alcohol in the liquid phase at an ambient pressure suitable for preservation of atomic hydrogen, i.e., above the melting point of the alcohol or below the boiling point of the alcohol at the ambient pressure, depending on whether the low molecular weight or high molecular weight alcohols are being reacted in the process. A range of temperature from 25° C. to —5° C. has been found satisfactory for $C_3$ to $C_8$ alcohols. For alcohols with less than 3 carbon atoms, temperatures to —80° C. will be required to maintain the liquid phase in the reaction zone. Many of the alcohols having above eight carbon atoms in their structure are solid within the preferred temperature range. Some of the latter may be liquefied by increasing the temperature to 60° C. or more. It will be advantageous to liquefy the extremely high melting alcohols above about $C_{12}$ with from 1 to 100 percent of a diluent inert to atomic hydrogen under the reaction conditions such as dimethylformamide.

The atomic hydrogen used was produced from tank hydrogen which was passed through the field established within a microwave resonance cavity operating at a frequency of 2450 megacycles and a power of approximately 100 watts. Since the hydrogen produced by the discharge procedure is rather low unless moisture is present in the hydrogen gas which is used, the tank hydrogen was merely passed through a deoxygenation unit to remove oxygen and then used directly without drying or other moisture removal.

The apparatus and conditions in the following example are now set forth. Certain variations are noted for one or more of the specific examples. Pyrex tubing used to transport the $H/H_2$ stream to the reactor was cleaned by a special procedure consisting of (1) filling with warm alcoholic potassium hydroxide and standing for 10–15 minutes, (2) rinsing thoroughly with distilled water, (3) filling with 1:1 by volume concentrated nitric acid and water and standing for 10–15 minutes, (4) rinsing thoroughly with distilled water, and (5) drying the tubing thoroughly in vacuo in place in the apparatus. The Pyrex tubing led into the reactor in which the desired alcohol was maintained in the liquid state by suitable cooling. The tubing terminated approximately one-half inch above the surface of the liquid. The reactor was connected through a dry ice-type condenser to a liquid nitrogen trap and thence to a vacuum pump. A flow rate of 30 cc. per minute of hydrogen (STP) was used in all of the examples. With this flow of hydrogen, a pressure of 0.4–0.6 millimeter mercury was developed using constant pumping. The alcohols were maintained at temperatures of −5° C. to 60° C. in order to keep them in the reaction flask.

*Example I*

Twenty-five milliliters of n-butyl alcohol were placed in the reactor, cooled suitably, and atomic hydrogen was reacted with it for 12–14 hours.

Based on analysis of the material from the liquid nitrogen trap about 0.8 mol of n-butyric aldehyde per 100 moles of hydrogen and about 0.7 mol of acetaldehyde per 100 mols of hydrogen were produced.

*Example II*

In a second run, carried out under the same conditions and with the same apparatus described in Example I, 25 mls. of n-amyl alcohol were substituted for the butyl alcohol. Products recovered from the trap included 0.5 mol valeric aldehyde per 100 mols of hydrogen and about 1.0 mol acetaldehyde per 100 mols of hydrogen.

*Example III*

When 3-pentanol was placed in the reactor and the reaction carried on as in the previous examples, about 0.2 mol of methylethyl ketone, 5.0 mols of diethyl ketone, and 0.6 mol of acetone per 100 mols of hydrogen were recovered.

*Example IV*

When 2-methyl-2-pentanol was placed in the reactor, about 4.0 mols of acetone and 1.0 mol of isopropyl alcohol per 100 mols hydrogen were recovered.

*Example V*

Atomic hydrogen was reacted with liquid amyl alcohol at 10–15° C., obtaining a polyether which was further characterized as a polyoxymethylene. Its infrared spectrum is almost identical with that of paraformaldehyde. However, this polymer, unlike paraformaldehyde, is quite heat stable. Elemental analysis gave:

|  | Found | Theory (for $[-CH_2O-]_x$) |
|---|---|---|
| Percent C | 40.1 | 40.0 |
| Percent H | 4.4 | 6.7 |
| Percent O | 53.1 | 53.3 |
| Total | 97.6 | 100.0 |

The percent C and percent O check out well with theory. An error appears to have been made in this hydrogen analysis. Since the initial analysis was unsatisfactory, the stable polyoxymethylene was re-analyzed:

|  | Found | | Theory (for $[-CH_2O-]_x$) |
|---|---|---|---|
|  | 1st Analysis | 2d Analysis |  |
| Percent C | 40.1 | 40.9 | 40.0 |
| Percent H | 4.4 | 7.0 | 6.7 |
| Percent O | 53.1 | (¹) | 53.3 |
| Total | 97.6 |  | 100.0 |

¹ Analysis not available yet.

The results of the second analysis agree quite closely with the formula for $(-CH_2O-)_x$. The slight excess of C and H is due to the presence of end groups such as $CH_3-$, $C_3H_7-$, $C_2H_5-$, or $C_4H_9-$.

Carbonyl compounds produced by this reaction have been identified by mass analysis as acetaldehyde, acetone, and a $C_5$ aldehyde. Chemical evidence in the form of a 2,4-dinitrophenylhydrazone derivative indicates the presence of n-valeraldehyde. This derivative melts at 103.5–4.0° C. (literature M.P.—98 or 106° C.). A mixed melting point with a known sample of n-valeraldehyde 2,4-dinitrophenylhydrazone of M.P.—106–7° C. gave a M.P.—105–6° C. A further product of this reaction was a solid which, when recrystallized from benzene, melted at 130–2° C. The infrared spectrum indicated this material to be an aliphatic alcohol with a structure quite similar to n-amyl alcohol. Elemental analysis indicated the compound to be $[C_4H_9CHOH-]_2$.

|  | Found | Theory (for $[C_4H_9CHOH-]_2$) |
|---|---|---|
| Percent C | 68.8 | 69.0 |
| Percent H | 13.0 | 12.6 |

This compound or product is denominated meso-5,6-decanediol.

The liquid products of this reaction found in the cold trap included 2 or more carbonyl compounds. The liquid gave positive Schiff and methone tests indicating the presence of aldehydes. A 2,4-dinitrophenylhydrazone derivative of the liquid exhibited a broad melting point (80–90° C.). After three recrystallizations, it melted sharply at 103.5–4.0° C. This, together with the infrared spectrum of the derivative, indicates the presence of n-valeraldehyde as one of the aldehyde components.

A third material isolated as a product of this reaction was a very high boiling solid plus liquid found in the reaction flask after the unreacted amyl alcohol was flashed off. It had an infrared spectrum which is very similar to that of amyl alcohol indicating it to be a longer chain monoalcohol or a polyol.

A gas phase sample taken during the run showed the presence of $CH_4$, $C_2H_6$, $C_3H_8$, and $C_4H_{10}$ hydrocarbons.

To be sure the products obtained by this reaction were from the amyl alcohol and not from impurities in it, an attempt was made to remove some small amounts of higher molecular weight material shown to be present by mass analysis in the roughly fractionated amyl alcohol. A careful fractionation failed to accomplish any purification. A second try at obtaining pure $n-C_5H_{11}OH$ consisted of carefully fractionating n-amyl acetate, hydrolyzing with base, and carefully fractionating the resulting alcohol. This method gave n-$C_5H_{10}$OH which was essentially free of higher molecular weight impurities. Gas chromatography gave the following results (no cuts were identified but the analysis indicates 95+ percent purity).

Components in order of elution:

| | Weight percent |
|---|---|
| 1 and 2 | 0.1 |
| 3 | 0.04 |
| 4 | 0.02 |
| 5 and 6 | 0.8 |
| 7 | 0.1 |
| 8 | 0.03 |
| 9 | 0.15 |
| 10 | [1] 3.8 |
| 11 | [2] 95 |

[1] (Possibly isoamyl alcohol.)
[2] (n-Amyl alcohol.)

Using this pure alcohol, the same products were obtained as in the previous work. This indicates that the products obtained resulted from H·/amyl alcohol interaction.

*Example VI*

A spectrally identical polymer to that of the preceding example was obtained with pure n-$C_4H_9$OH. Aldehydic and hydroxylic products were also obtained.

*Example VII*

The reaction of H· with n-octanol produced a resinous substance which coated the walls of the reaction flask when the reaction temperature was approximately 0° C. The infrared spectrum of the resinous material showed the presence of both carbonyl and hydroxyl groups. The resin was insoluble in all of the common organic solvents. It did not melt below 300° C. although browning occurred around 250° C. Elemental analysis gave the following results.

| | Found | Theory for Octanol |
|---|---|---|
| Percent C | 76.8 | 74.0 |
| Percent H | 12.4 | 13.8 |
| Percent O | [1] 10.8 | 11.2 |

[1] By difference.

It appears that both hydrogen and oxygen have been lost from the parent alcohol to produce the resin.

*Example VIII*

The reaction of H· with n-butanol at 0–5° C. is very similar to that with n-amyl alcohol. A polyoxymethylene polymer was found in the liquid $N_2$ trap downstream from the reaction vessel. It was heat stable and exhibited an infrared spectrum identical with that obtained with the polyoxymethylene from H· plus n-amyl alcohol.

Carbonyl compounds were also produced. One has been identified as n-butyraldehyde by preparation of a 2,4-dinitrophenylhydrazone derivative.

High boiling diols were also produced, apparently in both meso- and d, l-racemate forms. The meso form was well identified, it being a known compound. Upon recrystallization from $C_6H_6$ the solid fraction of the diol melted at 120–1° C. Beilstein gives the melting point for meso-($C_3H_7$CHOH—)$_2$ as 123° C.

*Example IX* n-Propanol treated with atomic hydrogen at 0–5° C. gave polyoxymethylene polymer.

*Example X*

A mixture of 83 parts n-propanol and 17 parts 2-butanol were reacted with atomic hydrogen as herein described at approximately 0° C. There were obtained a small amount of polyoxymethylene polymer similar to that obtained with n-pentanol, traces of methylethyl ketone, acetone, propionaldehyde and acetaldehyde.

*Example XI* n-Pentanol under reaction with atomic hydrogen at 10–15° C. yielded n-valeraldehyde, acetaldehyde, stable polyoxymethylene polymer with end groups which are probably alkyl radicals, saturated $C_1$ to $C_4$ hydrocarbons, and meso-5,6-decanediol.

*Example XII*

A 2/1 mixture of 1-pentanol and 1-octene at 0–5° C. yielded n-octane, a small amount of stable polyoxymethylene polymer similar to that obtained with 1-pentanol alone, and a trace of oil substance which may be an aliphatic alcohol.

The alcohols as indicated can be of different molecular weight and mixtures of them or their isomers can be used to obtain interesting products or reaction masses, useful per se as now known in the art or in further research to expand the sum total of useful knowledge. The alcohols which are useful include methanol, which can be converted to products including a substantial proportion of methane, propanols, butanols, pentanols, hexanols, etc. The alcohols which have yielded polyoxymethylene in the work which has been effected are n-propanol, n-butanol, and n-pentanol. Indications are that n-hexanol will also yield polyoxymethylene. n-Octanol has produced in the reaction zone at about 0° C. a cross-linked polymer containing carbonyl and hydroxyl groups. This material is a resinous substance which is useful as a coating material. Please see Example VII.

The alcohols which can be used as starting materials include:

Methanol
Ethanol
1-propanol
2-propanol
1-butanol
2-butanol
2-methyl-1-propanol
2-methyl-2-propanol
1-pentanol
2-methyl-1-butanol
3-methyl-1-butanol
2-pentanol
2-ethyl-2-propanol
2,2-dimethyl-1-propanol
3-methyl-2-butanol
3-pentanol
1-hexanol
4-methyl-1-pentanol
3-methyl-1-pentanol
2-methyl-1-pentanol
2-hexanol
3,3-dimethyl-1-butanol
2,2-dimethyl-1-butanol
1,1-dimethyl-1-butanol
2,3-dimethyl-1-butanol
4-methyl-2-pentanol
3-methyl-2-pentanol
2-methyl-2-pentanol
1-heptanol
5-methyl-1-hexanol
3-methyl-1-hexanol
2-heptanol
5-methyl-2-hexanol
4-methyl-2-hexanol
3-methyl-2-hexanol
3-heptanol
2-methyl-3-hexanol
5-methyl-3-hexanol
3-methyl-3-hexanol
1-octanol
2-methyl-2-nonanol
3-methyl-3-nonanol
1-undecanol
2-methyl-2-decanol
3-methyl-3-decanol
3-methyl-1-decanol
2-undecanol
3-undecanol
1-dodecanol
10-methyl-1-undecanol
2-methyl-2-undecanol
3-methyl-3-undecanol
2-dodecanol
3-dodecanol
1-tridecanol
11-methyl-1-dodecanol
2-methyl-2-dodecanol
3-methyl-3-dodecanol
2-tridecanol
6-tridecanol
1-tetradecanol
12-methyl-1-tridecanol
2-methyl-2-tridecanol
2-tetradecanol
7-tetradecanol
12-methyl-7-tridecanol
1-pentadecanol
13-methyl-1-tetradecanol
2-methyl-2-tetradecanol
2-pentadecanol
8-pentadecanol
2-methyl-7-tetradecanol
1-hexadecanol
14-methyl-1-pentadecanol
2-hexadecanol
8-hexadecanol
2-methyl-2-pentadecanol
1-heptadecanol
15-methyl-1-hexadecanol
2-hexadecanol

| | |
|---|---|
| 3-methyl-1-heptanol | 8-methyl-1-hexadecanol |
| 6-methyl-1-heptanol | 8-heptadecanol |
| 4-methyl-1-heptanol | 2-methyl-2-hexadecanol |
| 3-methyl-2-heptanol | 1-octadecanol |
| 2-methyl-2-heptanol | 16-methyl-1-heptadecanol |
| 5,5-dimethyl-1-hexanol | 2-heptadecanol |
| 3,5-dimethyl-1-hexanol | 8-methyl-1-heptadecanol |
| 3,5-dimethyl-2-hexanol | 9-octadecanol |
| 2-methyl-3-ethyl-2-pentanol | 2-methyl-2-heptadecanol |
| 1-nonanol | 1,3-diphenyl-2-propanol |
| 3-methyl-1-octanol | ditolylmethanol |
| 5-methyl-1-octanol | 2-phenyl-1-ethanol |
| 5-methyl-2-octanol | 1,3-diphenyl-2-methyl-2-propanol |
| 5-methyl-4-octanol | 1,3-dicyclohexyl-1-propanol |
| 4-methyl-4-octanol | 1,3-dicyclohexyl-2-propanol |
| 3-methyl-3-octanol | 1,5-dicyclohexyl-3-pentanol |
| 2-methyl-2-octanol | 1,5-diphenyl-3-pentanol |
| 1-decanol | |
| 8-methyl-1-nonanol | |
| 5-methyl-1-nonanol | |
| 8-methyl-2-nonanol | |

Referring to the drawing, hydrogen gas is passed as herein described through an externally air-cooled tubing 1 in which it is subjected to an electrodeless discharge at 2 to convert a substantial portion of it to atomic hydrogen. The hydrogen so treated is passed into reactor 3 in which it contacts the alcohol (or reactants present at any given time of the operation). A stream of gases and vapors passes from reactor 3 by pipe 4 into a Dry Ice trap 5, from which condensibles are returned to the reactor. Non-condensed gases, vapors and reaction products which pass through the Dry Ice trap are conducted through tube 6 into a liquid nitrogen trap 7 which acts as a product trap. It is in this trap that polyoxymethylene is found. A further trap 8 is provided as a pump isolation trap and some product can collect in it. It is of particular interest that the reaction with atomic hydrogen as here conducted, employing the modus operandi just described, results in the production and recovery of the polymer, for example, as described in Example VIII.

One skilled in the art in possession of this disclosure, having studied the same, should note that the now preferred temperature is usually found in the lower areas of the ranges given herein. Thus, the volatility of the lower molecular weight species of starting alcohols are maintained liquid by a suitable choice of temperature within the ranges mentioned. Some of the alcohols, set forth as suitable feed materials for the process of this invention, melt at temperatures above 60° C. These materials cannot, strictly speaking, be contacted in the liquid phase within the upper temperature limit of 60° C. which has been specified. It is also true that the highly volatile alcohols are not strictly maintained in the liquid phase and display an appreciable rate of distillation under the low pressure conditions which are favorable for atomic hydrogen preservation. Both types of alcohols are less troublesome and give excellent reactions when diluted with 1 to 100 volume percent of dimethylformamide before reacting with atomic hydrogen.

Reasonable variation and modification are possible within the scope of the foregoing disclosure, the drawing, and the appended claims to the invention the essence of which is that alcohols are converted with atomic hydrogen at low temperatures of the order of ambient or less, preferably 60° C. or less, and as low as about −80° C., or somewhat lower, to yield interesting products, among the products there being included those herein set forth, at least one of which is novel and that a modus operandi of so conducting the conversion as to form said products has been set forth.

I claim:

1. A process for the preparation of a reaction product including a compound selected from the group consisting of an aldehyde and a ketone which comprises reacting a liquid alcohol with atomic hydrogen supplied from a source external to the reacting mass at a temperature in the approximate range −80 to 60° C.

2. A process according to claim 1 wherein the alcohol contains 1–18 carbon atoms.

3. A process according to claim 1 wherein the alcohol is selected from the group consisting of n-propanol, n-butanol, n-pentanol, 3-pentanol, 2-methyl-2-pentanol, n-hexanol, and 2-butanol.

4. A process according to claim 1 wherein the alcohol is selected from the group consisting of n-propanol, n-butanol, n-pentanol, and n-hexanol and the product recovered includes stable polyoxymethylene.

5. A process according to claim 1 wherein the alcohol is diluted with 1 to 100 volume percent of dimethylformamide prior to contacting with atomic hydrogen.

6. A process according to claim 2 in which the alcohol is diluted with 1 to 100 volume percent of dimethylformamide before reacting with atomic hydrogen.

7. A process according to claim 1 wherein the alcohol has a number of carbon atoms in the range $C_3$–$C_8$ and the temperature is in the approximate range −5 to 25° C.

8. A process according to claim 1 wherein the alcohol has a number of carbon atoms in the range 1–8 and the temperature is in the range −80 to 25° C.

9. A process according to claim 1 wherein the reaction is effected at a subatmospheric pressure.

10. A process according to claim 9 wherein the pressure is of the order of less than a millimeter of mercury.

11. A process for the preparation of a stable polyoxymethylene polymer which comprises reacting at a temperature in the approximate range 0–15° C. and at a subatmospheric pressure with atomic hydrogen supplied from a source external to the reacting mass an alcohol maintained in the liquid phase, said alcohol being selected from the group consisting of n-propanol, n-butanol, n-pentanol, and n-hexanol.

12. A process for the preparation of a reaction product including a compound selected from the group consisting of an aldehyde and a ketone which comprises reacting a liquid alcohol with atomic hydrogen supplied from a source external to the reacting mass at a temperature in the approximate range of ambient temperature to approximately −5° C., at a subatmospheric pressure of the order of less than a millimeter.

13. A process according to claim 12 wherein the atomic hydrogen and alcohol are reacted under conditions permitting gaseous and vaporous products to escape from the reaction zone into a zone maintained at a temperature of the order of that of Dry Ice, wherein gases and vapors condensed in the last-mentioned zone are returned to the reaction zone, and wherein non-condensed material is passed to a further zone which is cooled to a temperature of the order of that of liquid nitrogen for the recovery of additional product.

14. A process according to claim 13 wherein the product recovered in the zone maintained at a temperature of the order of liquid nitrogen includes stable polyoxymethylene and wherein in the reaction zone there is present at least one alcohol selected from the group consisting of n-propanol, n-butanol, n-pentanol, and n-hexanol.

15. A process for the preparation of a stable polyoxymethylene polymer which comprises reacting at a temperature in the approximate range −5 to 25° C. and at a subatmospheric pressure with atomic hydrogen supplied from a source external to the reacting mass an alcohol maintained in the liquid phase, said alcohol being selected from the group consisting of n-propanol, n-butanol, n-pentanol, and n-hexanol.

16. A process for the preparation of a reaction product including a cross-linked resin which comprises reacting in liquid phase an alcohol of at least 8 carbon atoms with atomic hydrogen supplied from a source external to the reacting mass at a temperature in the approximate range —80 to 60° C. and recovering a resin from the reaction mass thus obtained.

17. A process according to claim 16 wherein the alcohol is n-octanol and the resin contains hydroxyl and carbonyl groups.

18. A process for the preparation of a reaction product including a compound selected from the group consisting of an aldehyde and a ketone which comprises reacting a liquid alcohol with atomic hydrogen supplied from a source external to the reacting mass at a temperature in the approximate range —80 to 60° C., the temperature selected in said range being one at which the alcohol is liquid at an ambient pressure at which atomic hydrogen is best preserved.

19. A process for forming a resin containing carbonyl and hydroxyl groups infusible below about 300° C. which comprises reacting atomic hydrogen at about 0° C. with n-octanol.

References Cited in the file of this patent

UNITED STATES PATENTS

| | | |
|---|---|---|
| 1,489,724 | Wendt | Apr. 8, 1924 |
| 2,071,252 | Carothers | Feb. 16, 1937 |
| 2,097,348 | Shipp | Oct. 26, 1937 |
| 2,179,488 | Beamer | Nov. 14, 1939 |
| 2,299,806 | Dreyfus et al. | Oct. 27, 1942 |
| 2,657,242 | Siggia | Oct. 27, 1953 |
| 2,752,399 | Grimme | June 26, 1956 |
| 2,818,441 | Vaughan et al. | Dec. 31, 1957 |
| 2,848,495 | Villemey | Aug. 19, 1958 |
| 2,953,602 | Aries | Sept. 20, 1960 |

OTHER REFERENCES

Steacies: Atomic and Free Radical Reactions (ACS Monograph Series No. 125, vol. 2, 2nd Ed.), Reinhold Publishing Corp., New York (1954), pages 594–595 relied upon.